United States Patent [19]

Kageyama

[11] Patent Number: 4,742,138

[45] Date of Patent: May 3, 1988

[54] PRODUCTION OF ETHYLENE COPOLYMERS

[75] Inventor: Yoshiteru Kageyama, Yokkaichi, Japan

[73] Assignee: Mitsubishi Petrochemical Company Limited, Tokyo, Japan

[21] Appl. No.: 9,106

[22] Filed: Jan. 29, 1987

Related U.S. Application Data

[63] Continuation of Ser. No. 783,270, Oct. 4, 1985, abandoned, which is a continuation of Ser. No. 605,108, Apr. 30, 1984.

[30] Foreign Application Priority Data

May 9, 1983 [JP] Japan ................................. 58-80559

[51] Int. Cl.$^4$ .............................................. C08F 4/64
[52] U.S. Cl. .................................................. 526/125
[58] Field of Search ........................................ 526/125

[56] References Cited

U.S. PATENT DOCUMENTS

| | | | |
|---|---|---|---|
| 4,269,948 | 5/1981 | Nicco | 525/53 |
| 4,405,774 | 9/1983 | Miwa et al. | 526/125 X |
| 4,451,688 | 5/1984 | Kuroda | 526/125 |

*Primary Examiner*—Paul R. Michl
*Attorney, Agent, or Firm*—Oblon, Fisher, Spivak, McClelland & Maier

[57] ABSTRACT

A catalyst and a process for copolymerizing ethylene with an α-olefin at a high temperature and pressure of not less than 200 kg/cm$^2$ and 125° C. by the use of the catalyst, which catalyst consists essentially of:
component A obtained by mixing and pulverizing
(1) a halocompound of magnesium,
(2) TiCl$_3$
(3) a halide of a IVa-group element, and
(4) an electron donor,
component B which is a halogen-containing organoaluminum, and
component C which is a compound represented by R$_{4-n}^4$Si(OR$^5$)$_n$ wherein $0 < n \leq 4$.

The resulting copolymer has a low content of double bonds and also has a decreased content of a low-crystalline copolymer.

12 Claims, No Drawings

PRODUCTION OF ETHYLENE COPOLYMERS

This application is a Continuation, of application Ser. No. 783,270, filed Oct. 4, 1985 NOW ABANDONED, WHICH IS A CONTINUATION OF ABANDONED APPLICATION 605,108. FILED Apr. 30, 1984.

BACKGROUND OF THE INVENTION

This invention relates to the production of ethylene copolymers under a pressure of at least 200 Kg/cm$^2$ and at a temperature of at least 125° C.

Recently, as disclosed in British Patent No. 828,828, processes for polymerizing ethylene at high temperature and pressure by ionic coordination polymerization using a Ziegler-type catalyst, with the use of a polymerization apparatus for high-pressure polyethylene have been proposed.

Also, it is currently known to copolymerize ethylene with an α-olefin by this process, whereby the density of the ethylene copolymer is controlled and a linear low-density polyethylene (LLDPE) is produced.

In the industrial production of the LLDPE, the above mentioned process is very advantageous in that an existing apparatus for production of high-pressure polyethylene can be utilized as it is, and new investment in the apparatus is not needed.

The following problems, however, have existed when an ethylene copolymer is produced at high temperature and pressure with the use of a Ziegler-type catalyst, in comparison with the conventional process using this catalyst at low temperature and pressure.

Firstly, the ethylene copolymer produced at high temperature and pressure contains a large amount of a fraction extractable with boiling hexane. Such a copolymer causes blocking and the like when processed into films, etc., and also causes food-sanitation problems. The formation of the extractable fraction mainly depends on a low-crystalline copolymer wherein an α-olefin is copolymerized ununiformly.

Secondly, such a copolymer contains more double bonds in the polymer than the copolymer produced at low temperature and pressure. When a polymer contains a large amount of double bonds therein and especially in its polymer chain, the polymer is susceptible to oxidative decomposition and exhibits poor weathering properties.

Thus, development of a novel catalyst which solves the above described problems in the production of an ethylene copolymer to be polymerized with a Ziegler-type catalyst at high temperature and pressure has been desired.

SUMMARY OF THE INVENTION

It is an object of the present invention to solve the above described problems by the use of a catalyst of specific composition.

In accordance with the present invention, in one aspect thereof, there is provided a process for producing an ethylene copolymer, which comprises contacting ethylene and an α-olefin with a catalyst consisting essentially of the following component A, component B and component C under a pressure of at least 200 Kg/cm$^2$ and at a temperature of at least 125° C. thereby to produce the ethylene copolymer:

Component A

A solid composition obtained by mixing and pulverizing the following compounds (1) through (4),
(1) a halocompound of magnesium,
(2) titanium trichloride,
(3) a halocompound of a IVa-group element of the periodic table, and
(4) an electron donor;

Component B

An organoaluminum compound containing a halogen atom; and

Component C

A silicon compound represented by the formula $R_{4-n}^4 Si(OR^5)_n$ wherein $R^4$ and $R^5$ are each a hydrocarbon residue and n is a number defined by $0 < n > 4$.

In accordance with the present invention, in another aspect thereof, a catalyst for copolymerizing ethylene with an α-olefin under a pressure of at least 200 Kg/cm$^2$ and at a temperature of at least 125° C. is provided, which catalyst comprises the components A, B and C as hereinabove defined.

By copolymerization of ethylene with an α-olefin with a specific Ziegler-type catalyst at a pressure of at least 200 Kg/cm$^2$ and a temperature of at least 125° C. according to the present invention, the following improvements are made:

(1) the quantities of the n-hexane extractables in the polymer are very small in spite of the polymerization at high temperature and pressure;
(2) the amount of double bonds is markedly decreased in the polymer produced at the high temperature and pressure;
(3) the molecular weight of the polymer produced at the high temperature and pressure is increased. Thus, in the production of a polymer having the same M.I., polymerization can be carried out at a higher temperature, and the conversion of monomers can be increased.

The reasons why these effects can be obtained are not fully clarified but are considered critical due to the combination of the components A, B and C, and especially due to the presence of the components B and C, or, among others, the component C.

DETAILED DESCRIPTION OF THE INVENTION

Catalyst to be Used

The catalyst to be used in the present invention consists essentially of the components A, B, and C.

(1) Component A

The component A is a solid composition obtained by mixing and pulverizing the following compounds (1) through (4).

(1) A halocompound of magnesium

More specifically, examples of this compound are $MgF_2$, $MgCl_2$, $MgBr_2$ and $MgI_2$.

(2) Titanium trichloride

Titanium trichloride can be prepared by reducing titanium tetrachloride with hydrogen [TiCl$_3$(H)], with aluminum metal [TiCl$_3$(A)], with an organoaluminum compound or with some other like substance. Thus, for example, the titanium trichloride to be used in the present invention is not necessarily pure $TiCl_3$, but can be a compound composed of ⅔ mol $TiCl_3$ and ⅓ mol $AlCl_3$ as the above mentioned $TiCl_3(A)$. Alternatively, such as auxiliary component as $AlCl_3$ may be introduced into pure $TiCl_3$.

(3) A halocompound of the IVa-group element of the periodic table.

This halocompound is a compound having at least one bond of a halogen and the IVa-group element of the periodic table. Examples of this compound include a halocompound wherein the atomic valency of the IVa-element is satisfied by both a halogen atom and a group or atom other than a halogen atom such as an alkoxyl group, hydrogen or a hydrocarbon group. In this case, the alkoxyl group has an alkyl group containing 1 to about 20 carbon atoms. The hydrocarbon group is exemplified by the above mentioned alkyl group as well as phenyl group or tolyl group. Preferred halogens are chlorine and bromine.

More specifically, examples of the halocompounds include :
(a) a compound having silicon-halogen bonding such as $SiCl_4$, $Si(CH_3)Cl_3$, $Si(OC_2H_5)Cl_3$ and $HSiCl_3$;
(b) a compound having carbon-halogen bonding such as $CCl_4$ and $t-C_4H_9Cl$;
(c) a compound having tin-halogen bonding such as $SnCl_4$ and $Sn(n-C_4H_9)Cl_3$; and
(d) a compound having germanium-halogen bonding such as $GeCl_4$ and $Ge(CH_3)Cl_3$.

Of these halocompounds, especially preferred are the compounds represented by the formula $SiX_nR'_{4-n}$ wherein: X is a halogen; R' is a hydrocarbon group having 1 to 6 carbon atoms; and n is a number expressed by $2 \leq n \leq 4$. More specifically, examples of the halocompounds include silicon tetrachloride, silicon tetrabromide, methyl trichlorosilane, ethyl trichlorosilane, and dichlorodiethyl silane.

(4) Electron donor compounds

Of the compounds known as electron donor compounds, hereinafter referred to as electron donors, compounds such as alcohols, ethers, ketones, aldehydes, carboxylic acids and esters can be used.

Examples of the electron donors suitable for use in the present invention are as follows.

(a) $R^2COOR^3$

Esters wherein $R^2$ and $R^3$ are hydrocarbon residues, each having 1 to about 10 carbon atoms, respectively, which may be identical or different. In general, the hydrocarbon residue is a saturated or unsaturated alkyl or aryl group. More specifically, examples of these esters are ethyl acetate, ethyl benzoate, methyl methacrylate, and ethyl acrylate.

(b) $R^2OR^3$

Ethers wherein $R^2$ and $R^3$ are hydrocarbon residues, each having 1 to about 10 carbon atoms, respectively, which may be identical or different. In general, the hydrocarbon residue is an alkyl or aryl group. More specifically, examples of these ethers are diethyl ether and dibutyl ether.

(c) $R^2COR^3$ $R^2$ and $R^3$ are hydrocarbon residues,
Ketones wherein $R^2$ and $R^3$ are hydrocarbon residues, each having 1 to about 10 carbon atoms, which may be identical or different. In general, the hydrocarbon residue is an alkyl or aryl group. More specifically, examples of these ketones are acetone, methyl ethyl ketone, and dibutyl ketone.

(d) Alcohols

The alcohols are a monohydric alcohol or a polyhydric alcohol (containing up to 4 hydroxyl groups) having 1 to about 20, preferably 3 or 4, carbon atoms and including ether alcohols and ester alcohols. More specifically, examples of these alcohols are methanol, ethanol, n-butanol, hexanol, and ethylene glycol.

(e) Aldehydes

The aldehydes are aldehydes, each having 1 to about 10 carbon atoms, examples of which are acetaldehyde and propionaldehyde.

(f) Carboxylic acids

These acids are mono- to tetra-carboxylic acids, each having 1 to about 20 carbon atoms, examples of which are acetic acid, propionic acid, benzoic acid, and phthalic acid. The term 'carboxylic acids' herein also encompasses metal salts of the above mentioned carboxylic acids, such as calcium acetate, magnesium benzoate, and calcium stearate.

Of these electron donors, a compound selected from the compounds represented by the general formulas (a) $R^2COOR^3$, (b) $R^2OR^3$ and (c) $R^2COR^3$, wherein $R^2$ and $R^3$ are hydrocarbon residues, which may be identical or different, is preferred.

(5) Molar ratio

The ratio of the above described compounds (1) through (4) is optional as long as the effects of the present invention are exhibited.

In the catalyst to be used, it is preferable that the molar ratio of the halocompound of magnesium to titanium trichloride be 2 or more, preferably from 3 to 50, and that the amounts of the compounds (3) and (4) are in the range of 0.1 to 20%, preferably 1 to 10%, by weight of the four components, respectively. These compounds are mixed and pulverized.

(6) Mixing and pulverization/co-milling

The mixing and pulverization or co-milling of the above described four components (1) through (4) can be carried out by any pulverization means which makes possible intimate contact between the four components. The mixing and pulverization should be carried out under the condition of absence of moisture and air. As long as attention is paid to this condition, any means such as a rotary ball mill, a rod mill, an impact mill, or a vibration mill can be used. The degree of pulverization is such that a significant improvement can be obtained in the mixing and pulverization of the four components (1) through (4). The method, time, condition and the like of pulverization can be selected from this point of view. With the vibration mill, rotary ball mill or the like, the time of pulverization required for obtaining the desired catalyst composition depends upon the combination of conditions such as the packing ratios of the balls and the components, diameter of the balls, rotational speed or frequency of vibration, and pulverizing temperature.

In general, a composition having markedly improved catalytic performances can be obtained by pulverization within 100 hours. The pulverization can be carried out by either the wet or the dry system. All of the four components (1) through (4) are typically in a mixed state and pulverized from the start with respect to the compounds and quantities. It is also possible, however, to add each component to the pulverizing means intermittently. The resulting component A has a specific surface area of 50 to 400 m$^2$/g, preferably 150 to 250 m$^2$/g.

(2) Component B

The component B is an organoaluminum compound containing a halogen atom in an atomic ratio of $0 < $ halogen/Al$\leq 2$ and is preferably a compound represented by the general formula R$_{3-m}$AlX$_m$, wherein: R is a hydrocarbon residue having 1 to 10 carbon atoms; X is a halogen atom; and m is a number defined by $0 < m \leq 2$.

These compounds are, for example, alkylaluminum halides such as diethylaluminum monochloride, diisobutylaluminum monochloride, ethylaluminum sesquichloride and ethylaluminum dichloride. It is also possible to use a trialkylaluminum or an alkylaluminum alkoxide concomitantly with the alkylaluminum halide. The mixing ratio thereof is preferably in the range of 0.01 to 0.5 (molar ratio) to the alkylaluminum halide.

(3) Component C

As the component C, a silicon compound represented by the general formula R$_{4-n}^4$Si(OR$^5$)n, wherein R$^4$ and R$^5$ are a hydrocarbon residue having 1 to about 10 carbon atoms and n is a number defined by $0 < n \leq 4$ can be used.

More specifically, examples of these compounds are:
(a) a tetraalkoxy silane such as tetraethoxy silane and tetramethoxy silane and
(b) an alkylalkoxy silane such as phenyltriethoxy silane, dimethyldiethoxy silane and triethylethoxy silane.

(4) Preparation of the catalyst

The catalyst to be used in the present invention, composed of the combination of the components A, B and C, can be prepared by contacting these components at the same time or step-by-step, or as necessary by further subjecting a product of the contact to preliminary polymerization with an α-olefin having about 5 to about 14 carbon atoms, which preliminary polymerization is usually conducted at a temperature which is lower than that used in the principal polymerization, namely copolymerization, preferably at a temperature not higher than 50° C.

The silicon compound of the component C can be mixed from the beginning with the component A and/or the component B, but it is generally preferable that a catalyst precursor composed of the components A and B be prepared in advance, and then the component C be introduced thereinto at the time when or before the olefin to be polymerized is introduced to form the catalyst in the co-presence of the olefin.

(5) Molar ratio

As to the molar ratio of the components A, B and C, the ratio B/A is in the range of 1 to 100, preferably 3 to 50, and the ratio C/B is in the range of 0.05 to 2, preferably 0.1 to 1.

POLYMERIZATION

(1) Polymerization apparatus

The polymerization in the present invention can be carried out in a batch system but is preferably carried out in a continuous system. A polymerization apparatus which is generally used in high-pressure radical polymerization of ethylene can be used. More specifically, the apparatus is a continuous agitation vessel-type reactor or a continuous tubular reactor.

The polymerization can be carried out in a single reactor as a single region polymerization method. However, a multiplicity of reactors which are connected in series, as necessary, together with coolers can be used. Also, a single reactor in which the internal space has been effectively divided into several regions can be used. In such multi-region methods, the composition of monomers, catalyst, temperature, the concentration of molecular weight modifier and the like are ordinarily controlled respectively in each reactor or reaction region, so that the properties of the polymers obtained in each reactor or reaction region can be controlled. The modes of connecting the reactors in series include a combination of two or more vessel reactors, a combination of two or more tubular reactors, and a combination of one or more vessel reactors and one or more tubular reactors.

The polymer(s) produced in one or more reactors can be separated from unreacted monomers without removing catalyst residues and then treated as in the case of polymers of conventional high pressure processes. It is to be noted that removal of catalyst residues gives rise to high cost and long process time in the conventional low-pressure processes using a Ziegler-type catalyst. The mixture of unreacted monomers is mixed with an additional amount of the same monomers, repressurized and recycled into the reactor. The monomers to be thus added have such a composition as to return the monomer mixture to the original feeding composition. In general, the monomers to be added have a composition which substantially corresponds to the composition of the polymer separated from the reactor.

The catalyst is finely dispersed in a suitable inert liquid and injected directly into the reactor by means of a high-pressure pump. Examples of suitable inert liquid are white spirit, hydrocarbon oil, pentane, hexane, cyclohexane, heptane, toluene, a saturated aliphatic higher branched hydrocarbon, and mixtures thereof. This dispersion of the catalyst is preferably placed under a nitrogen seal so that the dispersion will not be contacted by water and air prior to introduction into the reactor. Further, ethylene and other monomers should contain substantially no water and oxygen.

The component A of the present solid catalyst has a very large surface area and is present as finely divided particles of about 0.1 to about 2 microns in the inert solvent. Thus, introduction of the catalyst into a reactor by means of a high pressure pump can be smoothly conducted at a constant concentration without clogging of the injection tube.

(2) Monomer and comonomer

The polymerization with the use of the catalyst of this invention is a copolymerization of ethylene with at least one α-olefin represented by the general formula R—CH=CH$_2$.

Examples of comonomers represented by the general formula R—CH=CH$_2$, wherein R is a hydrocarbon residue having 1 to 12 carbon atoms, include propylene, butene-1, pentene-1, hexene-1, heptene-1, octene-1, nonene-1, 4-methylpentene-1, and decene-1. These α-olefins can be copolymerized with ethylene up to 30% and preferably up to 3 to 20% by weight in the resulting copolymer. Polymers having a broad range of specific gravity can be obtained by copolymerization of ethylene with these α-olefins. The specific gravity of the resulting polymer is controlled by the type of copolymers and the composition of feed comonomers. More specifically, polymers having desired densities can be obtained in a range of the order of 0.890 to 0.955, preferably 0.890 to 0.945, especially 0.91 to 0.94.

The ethylene copolymers obtained with the catalyst of this invention have very small contents of fractions extractable in boiling hexane, these contents being in the range of 0.5 to 3% by weight and cause no foodsanitation problems. These copolymers exhibit excellent antiblocking properties when molded into films. These facts indicate that, by the use of the catalyst of this invention, the resulting ethylene copolymer has an optimized distribution of a copolymerized α-olefin, and that the formation of low-crystalline polymer is decreased.

(3) Polymerization Conditions

(1) Polymerization pressure

The polymerization pressure in the present invention is in the range of at least 200 Kg/cm$^2$, preferably 300 to 4,000 Kg/cm$^2$, and more preferably 500 to 3,500 Kg/cm$^2$.

(2) Polymerization temperature

The polymerization temperature is in the range of at least 125° C., preferably 150 to 350° C., and more preferably 180 to 320° C.

Although not essential in the present invention, mixture under the polymerization may form a single fluid phase or two separated phases depending on the conditions of the polymerization pressure and polymerization temperature used.

(3) Composition of feed gases

The composition of the feed gases introduced into the reactor normally comprises 40 to 95 mol% of ethylene, 5 to 60 mol% of at least one α-olefin monomer, and 0 to 20 mol% of hydrogen used as a molecular weight modifier.

(4) Residence time

The mean residence time in the reactor is related to the activity retaining time of the catalyst under the reaction conditions. The half-life of the catalyst to be used depends especially upon the temperature among the reaction conditions. It is preferable that the residence time of monomers in the reactor be made long when the catalyst used has a long life. The mean residence time in the present invention is in the range of 2 to 600 seconds, preferably 10 to 150 seconds, and more preferably 10 to 120 seconds.

EXPERIMENTAL EXAMPLES

Example 1

Preparation of catalyst components 900 ml (apparent volume) of stainless steel balls of 12.7-mm diameter were placed in a 1-liter stainless-steel pot. The pot was charged with 40 g of aluminum metal-reduced titanium trichloride [TiCl$_3$(AA)] which had been previously subjected to pulverization for 40 hours, 130 g of anhydrous magnesium chloride, 15 g of methyl methacrylate and 15 g of silicon tetrachloride, and sealed under a nitrogen atmosphere. The mixture was subjected to pulverization for 80 hours by means of a vibration mill. Then, the resulting solid composition thus mixed and pulverized was taken out of the mill within a dry box. The specific surface area of the pulverized solid was 170 m$^2$/g.

Preparation of catalyst dispersion

A 1-liter flask thoroughly purged with nitrogen was charged with 300 ml of n-hexane which had been amply deaerated and purified, and then with 5 g of the above prepared solid component (component A) and diethylaluminum chloride (component B) in such quantities as to make the atomic ratio of Al/Ti 12. The flask was further charged with hexene-1 which had been amply deaerated and purified in such an amount as to make the molar ratio of hexene/Ti 15 and was thereafter stirred for 2 hours. Then, phenyltriethoxy silane (component C, hereinafter referred to as PES) was added thereto in such an amount as to make the atomic ratio of Si/Al 0.5.

The resulting catalyst suspension was placed in a catalyst-preparation vessel with a stirrer which had been thoroughly purged with dry nitrogen. Then amply deaerated and purified n-hexane was added until the total volume reached 25 ml to make the concentration of the solid component 0.2 g/liter.

High-pressure polymerization

Ethylene and hexene-1 were copolymerized under the reaction conditions shown in Table 1 in a 1.5-liter autoclave-type continuous reactor with a stirrer.

As results of the polymerization, the yield relative to the catalyst is shown in Table 1, and the properties of the resulting polymer are shown in Table 2.

Example 2

The polymerization process of Example 1 was repeated except that the amount of hydrogen supplied was changed as shown in Table 1. The results are shown in Table 1 and Table 2.

Comparative Example 1

The polymarization of Example 1 was repeated except that the catalyst dispersion was prepared without addition of the component C (PES) in the preparation of the catalyst dispersion in Example 1. The results are shown in Table 1 and Table 2.

When the results of Example 1 are compared with those of Comp. Example 1, it is seen that the use of the component C in the catalyst serves to decrease the double bonds in the resulting polymer in spite of the same degree of density and MFR, to decrease markedly the amount of n-hexane extractable substances, which is a measure of the formation of a low-molecular polymer, and also to decrease the MFR.

Example 3

The polymerization of Example 1 was repeated except that the polymerization temperature and the amount of hydrogen were changed as shown in Table 1. The results are shown in Table 1 and Table 2.

Comparative Example 2

Polymerization was carried out under the conditions shown in Table 1 with the use of the dispersion prepared in Comparative Example 1 as the catalyst dispersion. The results are shown in Table 1 and Table 2.

From a comparison of the results of Example 3 with those of Comparative Example 2, it is seen that the presence of the component C exhibits results similar to those observed in Example 1 and Comparative Example 1.

Examples 4 and 5

Catalyst dispersions were prepared as in Example 1 except that methyltriethoxy silane (in Example 4) or tetraethoxy silane (in Example 5) was added instead of PES to make the atomic ratio of Si/Al 0.5. Polymerization was carried out with the use of the resulting catalyst dispersions. The results are shown in Table 1 and Table 2.

Examples 6 and 7

Catalyst dispersions were prepared as in Example 1 except that the catalyst components were changed as shown in the following Table. Polymerization was carried out with the use of the resulting catalyst dispersions. The results are shown in Table 1 and Table 2.

| Example | Catalyst Components (g) | | | |
|---|---|---|---|---|
| | $MgCl_2$ | $TiCl_3$ | Methyl methacrylate | Silicon tetrachloride |
| 6 | 130 | 40 | 20 | 10 |
| 7 | 130 | 40 | 10 | 20 |

Examples 8 and 9

Catalyst components were prepared as in the preparation of the catalyst component in Example 1, except that 15 g of dibutyl ether (in Example 8) or 15 g of dibutyl ketone was added respectively instead of methyl methacrylate. Polymerization was carried out with the use of the resulting catalysts. The results are shown in Table 1 and Table 2.

Comparative Example 3

A catalyst dispersion was prepared as in Example 1, except that instead of diethylaluminum chloride trihexylaluminum was added to make the atomic ratio of Al/Ti 12. Polymerization was carried out with the use of the resulting catalyst dispersion. The results are shown in Table 1 and Table 2. From a comparison with Example 1, it is seen that the excellent effects of the present invention were not exhibited in Comparative Example 3 wherein trihexylaluminum was used.

Comparative Example 4

A catalyst dispersion was prepared as in Example 1, except that instead of PES, 1.8 g of dimethylpolysiloxane ("KF96" of Shinetsu Silicone K.K., Japan) was added to make the ratio of

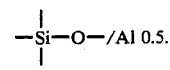

Polymerization was carried out with the use of the resulting catalyst dispersion. From a comparison with Example 1, it is seen that the excellent effects of the present invention were not exhibited in Comparative Example 3 wherein dimethylpolysiloxane was used.

TABLE 1

| Example | Polymerization Conditions | | | Feeding | | | | Yield per catalyst |
|---|---|---|---|---|---|---|---|---|
| | Pressure ($Kg/cm^2$) | Temperature (°C.) | Reaction time (second) | Feed (total) rate (Kg/hour) | Type of Comonomer | Comonomer content (% by wt) | Hydrogen content (mol %) | (gPE/g · solid catalyst) |
| Ex. 1 | 1000 | 260 | 40 | 30 | hexene-1 | 70 | 0.3 | 18,300 |
| Ex. 2 | 1000 | 260 | 40 | 30 | " | 70 | 1.0 | 16,200 |
| Comp. Ex. 1 | 1000 | 260 | 40 | 30 | " | 70 | 0.3 | 20,100 |
| Ex. 3 | 1000 | 240 | 40 | 30 | " | 70 | 2.5 | 21,300 |
| Comp. Ex. 2 | 1000 | 240 | 40 | 30 | " | 70 | 0.3 | 25,700 |
| Ex. 4 | 1000 | 260 | 40 | 30 | " | 70 | 0.3 | 18,900 |
| Ex. 5 | 1000 | 260 | 40 | 30 | " | 70 | 0.3 | 17,400 |
| Ex. 6 | 1000 | 260 | 40 | 30 | " | 70 | 0.3 | 17,300 |
| Ex. 7 | 1000 | 260 | 40 | 30 | " | 70 | 0.3 | 19,400 |
| Ex. 8 | 1000 | 260 | 40 | 30 | " | 70 | 0.3 | 15,500 |
| Ex. 9 | 1000 | 260 | 40 | 30 | " | 70 | 0.3 | 17,000 |
| Comp. Ex. 3 | 1000 | 260 | 40 | 30 | " | 70 | 0.3 | 13,300 |
| Comp. Ex. 4 | 1000 | 260 | 40 | 30 | " | 70 | 0.3 | 20,700 |

TABLE 2

| Example | MFR (g/10 minutes) | FR | Q value (Mw/Mn) | Density of polymer (g/cm³) | Double bonds in polymer (number/ $10^3 \times$ carbon)*1 | | | | n-hexane extractables (% by weight)*2 |
|---|---|---|---|---|---|---|---|---|---|
| | | | | | Internal double bonds | Vinyl group | Vinylidene group | Total number of double bonds | |
| Ex. 1 | 0.6 | 8.4 | 4.5 | 0.9219 | 0.08 | 0.50 | 0.10 | 0.68 | 1.3 |
| Ex. 2 | 10.8 | 8.2 | 4.3 | 0.9203 | 0.07 | 0.48 | 0.09 | 0.64 | 2.1 |
| Com. Ex. 1 | 10.2 | 7.6 | 4.1 | 0.9211 | 0.11 | 1.10 | 0.11 | 1.31 | 11.6 |
| Ex. 3 | 2.6 | 7.9 | 4.3 | 0.9210 | 0.06 | 0.42 | 0.07 | 0.55 | 0.9 |
| Com. Ex. 2 | 2.5 | 8.3 | 4.4 | 0.9193 | 0.08 | 0.86 | 0.09 | 1.03 | 4.4 |
| Ex. 4 | 2.1 | 8.1 | 4.2 | 0.9231 | 0.07 | 0.51 | 0.10 | 0.68 | 1.1 |

TABLE 2-continued

| Example | MFR (g/10 minutes) | FR | Q value (Mw/Mn) | Density of polymer (g/cm$^3$) | Double bonds in polymer (number/ $10^3 \times$ carbon)*[1] | | | | n-hexane extractables (% by weight)*[2] |
| --- | --- | --- | --- | --- | --- | --- | --- | --- | --- |
| | | | | | Internal double bonds | Vinyl group | Vinylidene group | Total number of double bonds | |
| Ex. 5 | 1.8 | 8.5 | 4.5 | 0.9220 | 0.08 | 0.53 | 0.10 | 0.71 | 1.6 |
| Ex. 6 | 2.7 | 8.3 | 4.3 | 0.9197 | 0.08 | 0.60 | 0.09 | 0.77 | 1.2 |
| Ex. 7 | 1.2 | 7.7 | 4.1 | 0.9213 | 0.07 | 0.48 | 0.10 | 0.66 | 1.5 |
| Ex. 8 | 4.3 | 8.4 | 4.4 | 0.9210 | 0.08 | 0.47 | 0.10 | 0.65 | 1.3 |
| Ex. 9 | 1.1 | 8.3 | 4.3 | 0.9208 | 0.09 | 0.49 | 0.09 | 0.67 | 1.7 |
| Com. Ex. 3 | 9.5 | 8.9 | 5.0 | 0.9233 | 0.13 | 1.31 | 0.12 | 1.74 | 12.0 |
| Com. Ex. 4 | 8.7 | 8.4 | 4.4 | 0.9211 | 0.08 | 1.07 | 0.11 | 1.26 | 10.4 |

*[1]determined by Infrared absorption spectrum
*[2]extracted in boiling hexane for 8 hours.

What is claimed is:

1. A process for producing an ethylene copolymer having a total double bond content ranging from 0.55 to 0.77 double bonds/1000 carbon atoms and a hexane extractable fraction ranging from 0.5 to 3% by wt., which comprises: copolymerizing ethylene with 3 to 20% by weight of the resulting copolymer of at least one α-olefin represented by the formula R—CH=CH$_2$, wherein R is a C$_1$-C$_{12}$ hydrocarbyl group, with a catalyst consisting essentially of the following component A, component B and component C under a pressure between 300 to 4000 Kg/cm$^2$ and at a temperature between 180° to 320° C. thereby to produce the ethylene copolymer:
   COMPONENT A
   A solid composition obtaining by mixing and pulverizing the following compounds (1) through (4),
   (1) a halocompound of magnesium,
   (2) titanium trichloride,
   (3) a halocompound of a IVa-group element of the Periodic Table, and
   (4) an electron donor;
   COMPONENT B
   An organoaluminum compound containing a halogen atom; and
   COMPONENT C
   A silicon compound represented by the formula R$_{4-n}^4$Si(OR$^5$)$_n$ wherein R$^4$ and R$^5$ are each a C$_1$-C$_{10}$ hydrocarbyl group and n is a number defined by $0<n<4$, said catalyst being prepared by contacting component (A) with component (B) thereby forming a catalyst precursor, and then contacting said catalyst precursor with component (C).

2. The process according to claim 1, in which the process is carried out substantially in the absence of a solvent.

3. The process according to claim 1, in which the density of the resulting ethylene copolymer is 0.890 to 0.945.

4. The process according to claim 1, in which the halocompound of a IVa-group element of the periodic table is a silicon halide.

5. The process according to claim 1, in which the electron donor is selected from the compounds represented by the formulas:

R$^2$COOR$^3$, R$^2$OR$^3$, and R$^2$COR$^3$ wherein R$^2$ and R$^3$ are each a C$_1$-C$_{10}$ hydrocarbyl group and may be identical or different.

6. The process according to claim 1, in which the component A, component B and component C are as defined below:
   Component A
   A solid composition obtained by mixing and pulverizing the following compounds (1) through (4),
   (1) a halocompound of magnesium,
   (2) titanium trichloride,
   (3) a silicon halide, and
   (4) a compound selected from the compounds represented by the followng formulas, R$^2$COOR$^3$, R$^2$OR$^3$, and R$^2$COR$^3$ wherein R$^2$ and R$^3$ are each a C$_1$-C$_{10}$ hydrocarbyl group and may be identical or different;
   Component B
   An organoaluminum compound containing a halogen atom; and
   Component C
   A silicon compound represented by the general formula R$_{4-n}^4$Si(OR$^5$)$_n$ wherein R$^4$ and R$^5$ are a C$_1$-C$_{10}$ hydrocarbyl group and n is a number defined by $0<n\leq4$.

7. The process according to claim 6, in which the process is carried out substantially in the absence of a solvent.

8. The process acording to claim 6, in which the density of the resulting ethylene copolymer is 0.890 to 0.945.

9. The process according to claim 6, in which the silicon halide is a compound represented by the general formula SiX$_n$R$_{4-n}^1$, wherein: X is a halogen; R$_1$ is a C$_1$-C$_6$ hydrocarbyl group; and n is a number defined by $2\leq n\leq4$.

10. The process according to claim 6, in which the molar ratio of magnesium halide/TiCl$_3$ is 3 to 50, and 1 to 10% each by weight of the silicon halide and the electron donor are contained in the component A.

11. The process according to claim 6, in which the molar ratio of component B/component A is from 3 to 50, and the molar ratio of the component C/component B is from 0.1 to 1.

12. The process according to claim 1, wherein the MFR of said ethylene copolymer ranges from about 0.6 to about 10.8

* * * * *